United States Patent Office 3,711,270
Patented Jan. 16, 1973

3,711,270
2,2'-METHYLENEBIS(TRANS-3,5-DIHYDROXY-STILBENE) AND USE AS BIOCIDE
Herbert George Arlt, Jr., Ridgefield, and Natalie Elaine Conroy, New Canaan, Conn., assignors to Arizona Chemical Company, New York, N.Y.
No Drawing. Original application Oct. 28, 1968, Ser. No. 771,359, now Patent No. 3,531,533, dated Sept. 29, 1970. Divided and this application Mar. 31, 1970, Ser. No. 24,377
Int. Cl. A01n 9/24
U.S. Cl. 71—67                                                  9 Claims

ABSTRACT OF THE DISCLOSURE

New stilbene derivatives having the following formula:

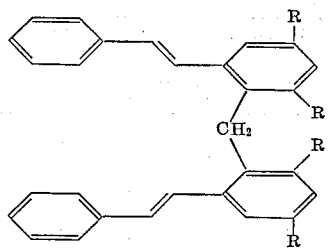

wherein R is methoxy or hydroxy; and a method for destroying or inhibiting microorganisms using the new stilbene derivatives.

---

This application is a division of copending application Ser. No. 771,359, filed Oct. 28, 1968 now United States No. 3,531,533.

This invention relates to new stilbene compounds and to a process for controlling undesirable microorganisms in natural waters, swimming pools, ornamental water installations, industrial process waters, industrial and municipal effluents and the like, by the use of such compounds. More particularly, it relates to processes for controlling the growth or eradicating algae and other microorganisms having a deleterious effect on industrial process water systems.

It is an object of this invention, therefore, to provide a process for inhibiting or eradicating microbial growth, and particularly algal growth, by contacting such growth with stilbene derivatives.

A further object is to provide new stilbene derivatives having biocidal activity.

These and other objects of the invention will become more apparent as the description thereof proceeds.

In accordance with the present invention, it has now been found that waters normally subject to infestation with microorganisms, and particularly algae, may be rendered free of such infestation or it may be effectively controlled within acceptable limits, by the addition of minor but effective amounts of a composition comprising a trans-stilbene compound of the formula:

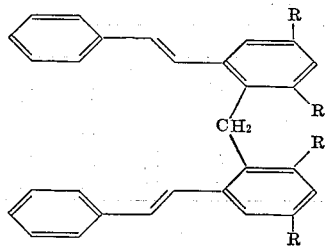

wherein R is methoxy or hydroxy.

These new compounds may be employed singly, in admixtures of two or more, or in formulations where they are dissolved, emulsified, adsorbed on carriers, etc., as well known in the art. They may be used either for the prevention of infestation with microorganisms, to inhibit the growth of such organisms, or for their partial or complete eradication.

Some of these aromatic stilbenes are found in nature, while others are products of chemical synthesis or chemical modifications of the naturally occurring compounds. Trans-3,5-dihydroxystilbene and its mono- and dimethyl ethers, for example, have been identified in extractives from the heartwood of the Pinus species.

The 2,2' - methylenebis(trans-3,5-substituted stilbene) is prepared from trans-3,5-substituted stilbene. Trans-3,5-dimethoxystilbene is available in tall oil head fractions. The fraction is treated with paraformaldehyde in the presence of an acid catalyst such as an acid clay catalyst at elevated temperature of from about 60° C. to 120° C. for from about 1 to 3 hours. The product is obtained by separation, e.g. filtration and solvent removal under vacuum, to obtain 2,2' - methylenebis(trans-3,5-substituted stilbene). The hydroxy derivative is obtained by demethylation, e.g. by known demethylation methods.

Contrary to the action of many other compounds which exhibit marked biocidal activity against a particular type of microorganism, the compounds of the present invention are remarkable for their broad spectrum of biocidal activity and show a high degree of toxicity against many distinctly different and unrelated microorganisms, including algae, fungi, bacterial, and the like, such as for example bacteria of the species Aerobacter, Bacillus, and Pseudomonas; fungi of the species Penicillium and Aerobacter; and algae of the species Ankistrodesmus, Anacystis, Gloeotrichia, Melosira, and Chlamydomonas. The compounds of this invention are effective at concentrations of one part per billion to about 200 parts per million.

The stilbenes of this invention may, of course, either be applied alone or as active ingredients in suitable formulations. For example, when large surface areas of water are to be treated, it is preferred to apply a dilute solution in a suitable water-soluble solvent, such as methanol, ethanol, 2-propanol, and the like. Such a solution may be sprayed on the surface to be treated. Alternatively an aqueous emulsion may be used.

The following examples are given to illustrate the invention and are not intended to be limitative.

EXAMPLE I

An 1100 g. sample of tall oil fatty acid (unsaponifiables 2.7%, rosin acids 4.1%) was treated with 0.5% paraformaldehyde on a steam bath one and one-half hours in the presence of 1% Super Filtrol clay and was filtered immediately. Vacuum distillation of the filtrate gave a 1.0% heads cut, a 91.8% main cut, and a 4.1% residue (recovery 96.9%). The residue was cooled carefully, and a small amount of white crystalline solids deposited slowly. After filtration and trituration of the mushy crystals with petroleum ether, the crude product was recrystallized from benzene to yield white needles with a sharp melting point of 192–193° C.

The ultraviolet spectrum was very similar to that of trans-3,5-dimethoxystilbene, with an absorption maximum at 304 m$\mu$, a=86.1 (trans - 3,5 - dimethoxystilbene $\lambda$max.=300 m$\mu$, a=122.8). The carbon and hydrogen analysis (80.2% C, 6.72% H) agreed with the empirical formula $C_{33}H_{32}O_4$; calculated: 80.5% C, 6.55% H. Infrared analysis indicated the presence of trans double bond absorption.

The compound was 2,2'-methylenebis(trans-3,5-dimethoxystilbene) having a structure as shown below.

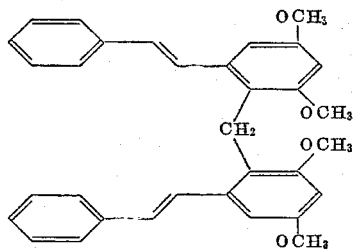

EXAMPLE II

A solution of 19.2 pounds trans-3,5-dimethoxystilbene in 25 pounds of tall oil fatty acids was treated with 2.7 pounds paraformaldehyde and 5.4 pounds of an acidic clay catalyst (marketed by Filtrol Corporation under the mark Super-Filtrol 22) for 1.5 hours at 90–100° C. Subsequent filtration and removal of solvent under vacuum yielded 19.6 pounds of 2,2'-methylenebis(trans - 3,5 - dimethoxystilbene). Demethylation of this compound with boron tribromide in methylene chloride under reflux yielded 16.5 pounds of 2,2'-methylenebis(trans-3,5-dihydroxystilbene).

EXAMPLE III

Three hundred pounds of a heads fraction from the fractionation of tall oil, having a boiling range of about 170–205° C. at 4 mm. pressure, was heated with 6 pounds paraformaldehyde and 25 pounds acid clay catalyst (marketed by Filtrol Corporation under the mark Super-Filtrol 22) for two hours at 100° C. A volatile fraction, consisting of 162 pounds, was then removed by distillation at 250° C. and 1–2 mm. pressure, and the still pot was cooled. Four hundred pounds of 1:1 acetone-methanol was then charged, and the solution was heated under reflux for 30 minutes. Upon cooling 9.2 pounds of 2,2'-methylenebis(trans-3,5-dihydroxystilbene) separated.

EXAMPLE IV

Five unialgal cultures, freshly obtained from the Culture Collection of Algae, Indiana University, were used. These were *Ankistrodesmus arcuatus, Chlamydomonas gigantea, Melosira varians, Anacystis aeruginosa,* and *Gloeotrichia echinulata*. A control was used for each species. Growth of the algal species was studied at two dilutions, 1:1,000 and 1:1,000,000. Properly diluted trans-3,5-dihydroxystilbene was added to each flask containing 200 ml. of medium and a specific algal form. Bristol's medium was used for *Ankistrodesmus arcuatus* and *Chlamydomonas gigantea;* Kopp's medium was used for *Melosira varians;* ASM medium was used for the other species. The flasks were placed on a gyratory shaker and illuminated with Gro-Lux fluorescent tubes, alternating ten hours of light with fourteen hours of darkness. Turbidity measurements were made daily for a period of one week on samples taken from each flask. The results so obtained are shown in the following table.

EXAMPLE V

Utilizing essentially the same test procedures described in Example 1, control of algal growth was obtained with the other compounds recited at substantially the same toxicant levels.

TABLE IA.—PERCENT OF CONTROL IN RELATION TO LIGHT TRANSMISSION FOR 2,2' - METHYLENEBIS (TRANS-3,5-DIHYDROXYSTILBENE)

| | Dilutions | | Dilutions | | Dilutions | | Dilutions | |
|---|---|---|---|---|---|---|---|---|
| | $10^3$ | $10^6$ | $10^3$ | $10^6$ | $10^3$ | $10^6$ | $10^3$ | $10^6$ |
| | Ankistrodesmus | | Anacystis | | Gloeotrichia | | Melosira | |
| Days: | | | | | | | | |
| 1 | 90 | 90 | 90 | 80 | 90 | 90 | 95 | 95 |
| 2 | 70 | 80 | 75 | 80 | 70 | 90 | 90 | 95 |
| 3 | 20 | 80 | 50 | 65 | 60 | 80 | 70 | 90 |
| 4 | 10 | 75 | 35 | 45 | 40 | 70 | 60 | 80 |
| 5 | 5 | 50 | 30 | 30 | 30 | 60 | 45 | 70 |
| 6 | 5 | 35 | 15 | 20 | 20 | 50 | 25 | 50 |
| 7 | 5 | 15 | 3 | 7 | 10 | 20 | 15 | 20 |

TABLE IB.—PERCENT OF CONTROL IN RELATION TO LIGHT TRANSMISSION FOR 2,2'-METHYLENEBIS (TRANS-3,5-DIHYDROXYSTILBENE)

| | Ankistrodesmus arcuatus | | | Anacystis aeruginosa | | |
|---|---|---|---|---|---|---|
| | Dilutions | | | Dilutions | | |
| | $10^3$ | $10^6$ | $10^9$ | $10^3$ | $10^6$ | $10^9$ |
| Days: | | | | | | |
| 1 | 95 | 95 | 99 | 99 | 99 | 99 |
| 2 | 80 | 85 | 90 | 87 | 90 | 95 |
| 3 | 75 | 79 | 83 | 75 | 78 | 80 |
| 4 | 50 | 57 | 59 | 69 | 71 | 79 |
| 5 | 30 | 39 | 43 | 53 | 59 | 65 |
| 6 | 20 | 27 | 29 | 34 | 39 | 41 |
| 7 | 3 | 4 | 7 | 2 | 10 | 11 |

While I have set forth certain specific embodiments and preferred modes of practice of the invention, it will be apparent that this is solely for the purpose of illustration, and that various changes and modifications may be made in the invention without departing from the spirit of the disclosure or the scope of the appended claims.

We claim:

1. A method for destroying or inhibiting algae which comprises applying thereto an effective amount to destroy or inhibit the algae of a stilbene derivative of the formula:

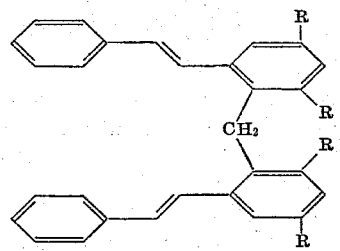

wherein R represents a member of the group consisting of methoxy and hydroxy groups.

TABLE 1.—PERCENT OF CONTROL IN RELATION TO LIGHT TRANSMISSION

| | Dilutions | | | Dilutions | | | Dilutions | | | Dilutions | | | Dilutions | | |
|---|---|---|---|---|---|---|---|---|---|---|---|---|---|---|---|
| | $10^3$ | $10^6$ | $10^9$ | $10^3$ | $10^6$ | $10^9$ | $10^3$ | $10^6$ | $10^9$ | $10^3$ | $10^6$ | $10^9$ | $10^3$ | $10^6$ | $10^9$ |
| | Ankistrodesmus | | | Gloeotrichia | | | Anacystis | | | Chlamydomonas | | | Melosira | | |
| Days: | | | | | | | | | | | | | | | |
| 1 | 20 | 50 | 70 | 15 | 80 | 85 | 30 | 60 | 70 | 50 | 60 | 70 | 40 | 70 | 80 |
| 2 | 15 | 35 | 50 | 10 | 80 | 80 | 20 | 40 | 65 | 40 | 55 | 65 | 35 | 65 | 75 |
| 3 | 5 | 30 | 40 | 10 | 75 | 80 | 15 | 30 | 60 | 35 | 50 | 55 | 25 | 60 | 75 |
| 4 | 0 | 30 | 40 | 5 | 70 | 75 | 0 | 30 | 55 | 30 | 45 | 60 | 15 | 60 | 70 |
| 5 | 0 | 20 | 40 | 0 | 70 | 75 | 0 | 25 | 50 | 25 | 45 | 55 | 10 | 55 | 70 |
| 6 | 0 | 20 | 35 | 0 | 70 | 75 | 0 | 20 | 40 | 25 | 40 | 55 | 10 | 50 | 65 |
| 7 | 0 | 20 | 35 | 0 | 70 | 75 | 0 | 20 | 35 | 20 | 40 | 50 | 3 | 50 | 60 |

This demonstrates the effectiveness of the compound against algal species which are difficult to control.

2. The method of claim 1 wherein said derivative is 2,2'-methylenebis(trans-3,5-dimethoxystilbene).

3. The method of claim 1 wherein said derivative is 2,2'-methylenebis(trans-3,5-dimethoxystilbene).

4. The method of claim 1 wherein said compound is applied in from 1 to 200 parts per million in an inert carrier.

5. A composition for controlling algae comprising a stilbene derivative in an amount effective to destroy or inhibit algae of the formula:

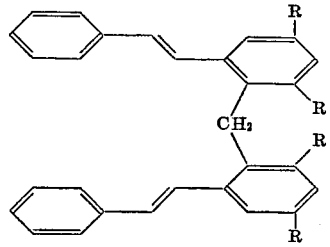

wherein R represents a member of the group consisting of methoxy and hydroxy groups in combination with an inert carrier.

6. The composition of claim 5 wherein said derivative is 2,2'-methylenebis(trans-3,5-dimethoxystilbene).

7. The composition of claim 5 wherein said derivative is 2,2'-methylenebis(trans-3,5-dimethoxystilbene).

8. The composition of claim 5 wherein said inert carrier is an inert liquid diluent.

9. The composition of claim 5 wherein said inert carrier is a solid carrier.

References Cited
UNITED STATES PATENTS 3,577,230  5/1971  Sheers _____ 71—67
2,990,420  6/1961  Gleim et al. _____ 71—67

LEWIS GOTTS, Primary Examiner

C. L. MILLS, Assistant Examiner

U.S. Cl. X.R.
71—122, 124; 424—341

UNITED STATES PATENT OFFICE
CERTIFICATE OF CORRECTION

Patent No. 3,711,270          Dated January 16, 1973

Inventor(s) HERBERT GEORGE ARLT, JR., AND NATALIE ELAINE CONROY

It is certified that error appears in the above-identified patent and that said Letters Patent are hereby corrected as shown below:

Column 4, Table 1A, line 13 under the heading $10^6$ Anacystis delete "80" and substitute -- 90 --.

Signed and sealed this 3rd day of July 1973.

(SEAL)
Attest:

EDWARD M. FLETCHER, JR.         Rene Tegtmeyer
Attesting Officer               Acting Commissioner of Patents